United States Patent
Fan et al.

(10) Patent No.: US 11,934,034 B2
(45) Date of Patent: Mar. 19, 2024

(54) DRIVING MECHANISM FOR OPTICAL ELEMENT

(71) Applicant: TDK TAIWAN CORP., Taoyuan (TW)

(72) Inventors: Chen-Hsien Fan, Taoyuan (TW);
Yueh-Lin Lee, Taoyuan (TW);
Yu-Chiao Lo, Taoyuan (TW);
Sung-Mao Tsai, Taoyuan (TW);
Shang-Hung Chen, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 316 days.

(21) Appl. No.: 16/843,332

(22) Filed: Apr. 8, 2020

(65) Prior Publication Data
US 2020/0363607 A1  Nov. 19, 2020

Related U.S. Application Data

(60) Provisional application No. 62/849,317, filed on May 17, 2019.

(30) Foreign Application Priority Data

Feb. 3, 2020 (CN) .......................... 202020150523.5

(51) Int. Cl.
*G02B 7/09* (2021.01)
*G02B 27/64* (2006.01)
*G03B 5/00* (2021.01)
*G03B 9/40* (2021.01)
*G03B 13/36* (2021.01)
(Continued)

(52) U.S. Cl.
CPC .............. *G02B 7/09* (2013.01); *G02B 27/646* (2013.01); *G03B 5/00* (2013.01); *G03B 9/40* (2013.01); *G03B 13/36* (2013.01); *H02K 11/21* (2016.01); *H02K 37/04* (2013.01); *H02K 41/0354* (2013.01); *H04N 23/55* (2023.01);
(Continued)

(58) Field of Classification Search
CPC .. G03B 5/00; G03B 13/36; G03B 2205/0007; G03B 2205/0053; G03B 3/02; G03B 3/10; G03B 5/04; G03B 30/00; G02B 7/021; G02B 7/08; G02B 7/09; G02B 7/10; G02B 9/62; G02B 13/001; G02B 13/0065; G02B 27/646; H04N 5/2253; H04N 5/2254; H04N 5/2257; H04N 5/23287; H02K 11/33; H02K 41/0356
USPC ....... 359/911, 554, 555, 557, 811, 813, 814, 359/824, 872, 877
See application file for complete search history.

(56) References Cited

U.S. PATENT DOCUMENTS 8,913,139 B2 * 12/2014 Park ..................... H04N 23/687
                                                        348/208.11
9,420,183 B2 *  8/2016 Hwang ................. H04N 23/68
(Continued)

*Primary Examiner* — Marin Pichler
(74) *Attorney, Agent, or Firm* — MUNCY, GEISSLER, OLDS & LOWE, PC

(57) ABSTRACT

An optical element driving mechanism is provided. The optical element driving mechanism includes a movable portion, a fixed portion, a driving assembly, and an assist assembly. The movable portion is used for connecting to an optical element having a main axis. The movable portion is movable relative to the fixed portion. The driving assembly drives the movable portion to move relative to the fixed portion. The assist assembly limits the movement of the movable portion relative to the fixed portion.

18 Claims, 12 Drawing Sheets

(51) Int. Cl.
*H02K 11/21* (2016.01)
*H02K 37/04* (2006.01)
*H02K 41/035* (2006.01)
*H04N 23/55* (2023.01)

(52) U.S. Cl.
CPC ............... *G03B 2205/0007* (2013.01); *G03B 2205/0069* (2013.01)

(56) References Cited

U.S. PATENT DOCUMENTS

| | | | | |
|---|---|---|---|---|
| 2011/0103782 | A1* | 5/2011 | Tsuruta | G02B 7/022 |
| | | | | 359/557 |
| 2012/0155843 | A1* | 6/2012 | Takizawa | H04N 5/232 |
| | | | | 396/55 |
| 2013/0076924 | A1* | 3/2013 | Wade | G03B 5/02 |
| | | | | 348/208.11 |
| 2015/0296112 | A1* | 10/2015 | Park | G02B 7/08 |
| | | | | 348/208.7 |

* cited by examiner

DRIVING MECHANISM FOR OPTICAL ELEMENT

CROSS REFERENCE TO RELATED APPLICATIONS

This application claims the benefit of U.S. Provisional Application No. 62/849,317, filed on May 17, 2019, and China Patent Applications No. 202020150523.5, filed on Feb. 3, 2020, which are incorporated by reference herein in their entirety.

BACKGROUND OF THE DISCLOSURE

Field of the Disclosure

The present disclosure relates to an optical element driving mechanism.

Description of the Related Art

As technology has developed, it has become more common to include image-capturing and video-recording functions into many types of modern electronic devices, such as smartphones and digital cameras. These electronic devices are used more and more often, and new models have been developed that are convenient, thin, and lightweight, offering more choices for consumers.

Electronic devices that have image-capturing or video-recording functions normally include a driving mechanism to drive an optical element (such as a lens) to move along its optical axis, thereby achieving auto focus (AF) or optical image stabilization (OIS). Light may pass through the optical element and may form an image on an optical sensor. However, the trend in modern mobile devices is to have a smaller size and better durability. As a result, how to effectively reduce the size of the driving mechanism and how to increase its durability have become important issues.

BRIEF SUMMARY OF DISCLOSURE

An optical element driving mechanism is provided, including a movable portion, a fixed portion, a driving assembly, and an assist assembly. The movable portion connects to an optical element having a main axis. The movable portion is movable relative to the fixed portion. The driving assembly drives the movable portion to move relative to the fixed portion. The assist assembly limits the movement of the movable portion relative to the fixed portion.

In some embodiments, the assist assembly comprises a support element disposed between the movable portion and the fixed portion. The support element allows the movable portion to rotate relative to the fixed portion in two axes. The axes extend in the first direction and the second direction. The first direction is not parallel to the second direction. In some embodiments, the support element further allows the movable portion to rotate relative to the fixed portion in an axis that extends in a third direction. The third direction is not parallel to the first direction or the second direction. In some embodiments, the fixed portion comprises a limit portion for limiting the movement of the movable portion relative to the fixed portion. The maximum size of the support element in the third direction is greater than the distance between the movable portion and the limit portion in the third direction. In some embodiments, the assist assembly further comprises a magnetic permeable element, wherein the support element is made of metal, and a magnetic force is generated between the magnetic permeable element and the support element to attract the magnetic permeable element and the support element. In some embodiments, the assist assembly further comprises a limit element. The support element is disposed in an opening of the limit element. The diameter of the opening of the limit element is greater than the diameter of the support element.

In some embodiments, the optical element driving mechanism further comprises a photo sensor that at least partially overlaps the driving assembly when viewed in a direction that is perpendicular to the main axis. In some embodiments, the optical element, the photo sensor, and the driving assembly at least partially overlap each other when viewed in a direction that is perpendicular to the main axis.

In some embodiments, the optical element driving mechanism further comprises an optical module, and the optical element is disposed in the optical module. In some embodiments, the optical module partially overlaps the driving assembly when viewed in a direction that is perpendicular to the main axis. In some embodiments, the optical element driving mechanism further comprises a circuit board, wherein the optical module further comprises a substrate, wherein an extension of the substrate and an extension of the circuit board are positioned on different sides of the optical element driving mechanism. In some embodiments, the substrate at least partially overlaps the circuit board along the main axis.

In some embodiments, the driving assembly comprises at least three driving magnets. In some embodiments, at least one of the driving magnets has a different shape than the other driving magnets. In some embodiments, the optical element driving mechanism further comprises at least position sensors, wherein each of the position sensors is positioned on the same side of the optical element driving mechanism as one of the driving magnets, to detect the magnetic fields of the driving magnets. In some embodiments, the direction of the magnetic fields that are detected by two of the position sensors are parallel. In some embodiments, the direction of the magnetic field that is detected by one of the position sensors is different than the direction of the magnetic fields that are detected by the two position sensors. In some embodiments, the driving magnets are multipolar magnets. In some embodiments, the magnets are arranged in different directions. In some embodiments, the movable portion comprises a wall that extends along the main axis and is adjacent to the driving assembly.

BRIEF DESCRIPTION OF DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF DISCLOSURE

Figure 1:
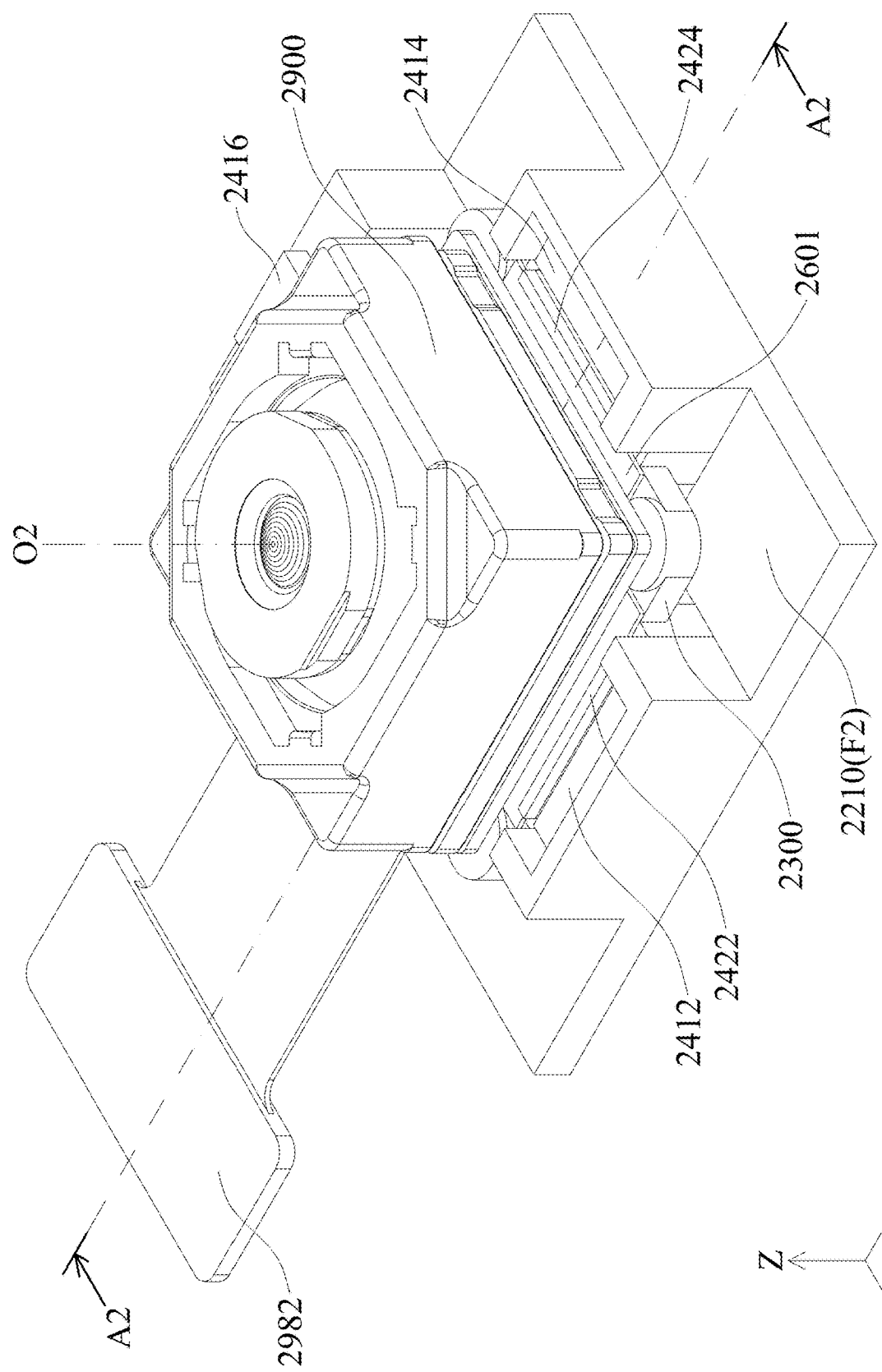
FIG. 1 is a schematic view of an optical element driving mechanisms in some embodiments of the present disclosure.
Figure 2:
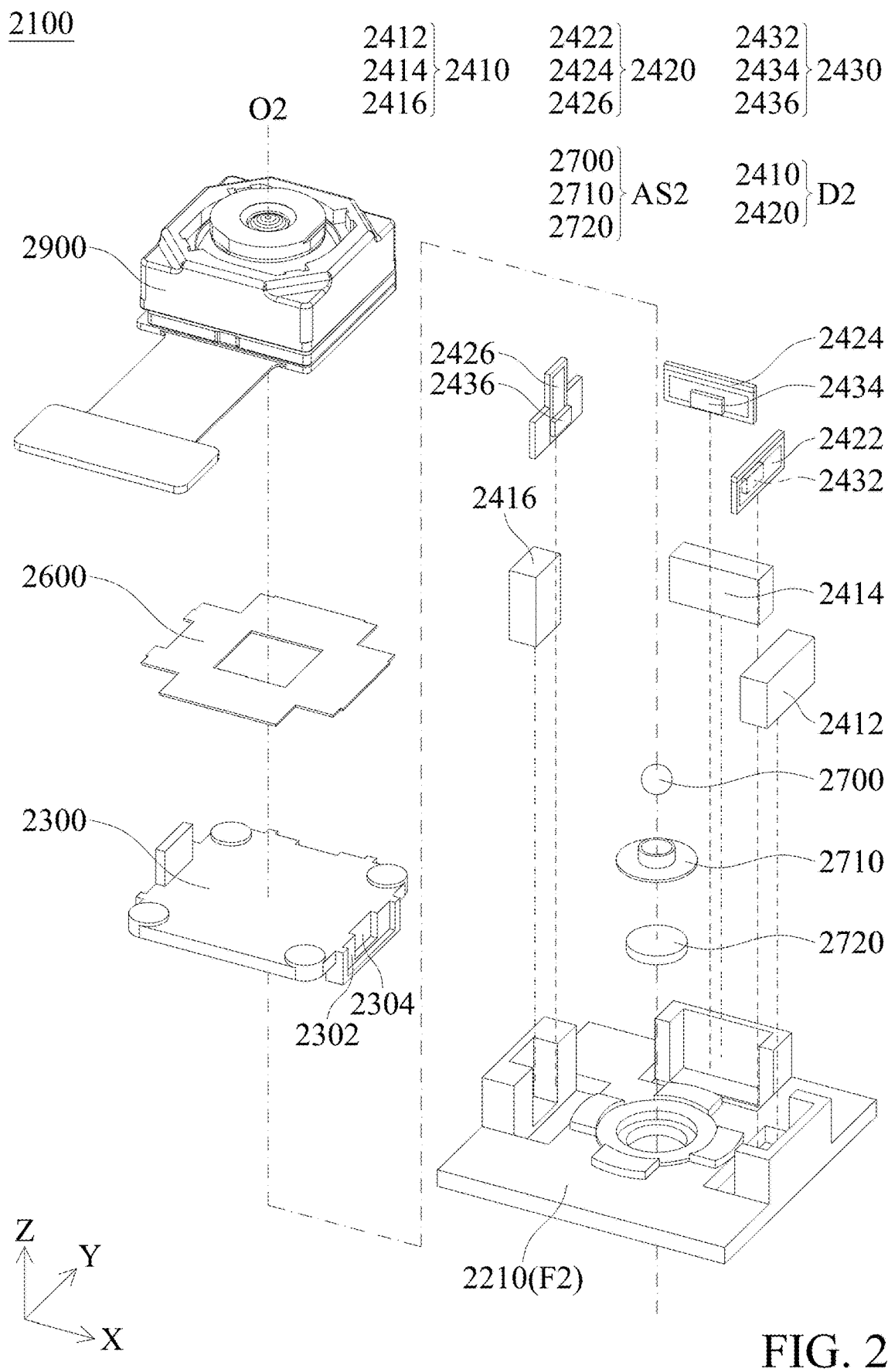
FIG. 2 is an exploded view of the optical element driving mechanism.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this disclosure belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

In some embodiments of the present disclosure, FIGS. 1 to 4 are a perspective view and an exploded view of an optical element driving mechanism 2100, a cross-sectional view illustrated along a line A2-A2 in FIG. 1, and a side view of the optical element driving mechanism 2100, respectively. In FIG. 1, the optical element driving mechanism 2100 mainly includes a base 2210, a movable portion 2300, a first magnetic assembly 2410 (includes three first magnetic elements 2412, 2414, 2416), a second magnetic assembly 2420 (includes three second magnetic elements 2422, 2424, 2426), a position sensor assembly 2430 (includes three position sensors 2432, 2434, 2436), a circuit board 2600, a support element 2700, a limit element 2710, and a magnetic permeable element 2720 arranged in a main axis O2. The optical element driving mechanism 2100 may be used for driving an optical module 2900, or may be used for driving various optical elements, such as a lens, a mirror, a prism, a beam splitter, or an aperture.

In some embodiments, the base 2210 may be called as a fixed portion F2, and the movable portion 2300 may move relative to the fixed portion F2. As a result, the optical module 2900 disposed on the movable portion 2300 may be moved by the movable portion 2300 to achieve auto focus (AF) or optical image stabilization (OIS).

In some embodiments, the first magnetic assembly 2410 and the second magnetic assembly 2420 may be called as a driving assembly D2 to drive the movable portion 2300 moving relative to the fixed portion F2. For example, the first magnetic assembly 2410 and the second magnetic assembly 2420 may include a combination of a driving coil and a driving magnet. For example, the first magnetic assembly 2410 may be a driving magnet, and the second magnetic assembly 2420 may be a driving coil. In another example, the first magnetic assembly 2410 may be a coil, and the second magnetic assembly 2420 may be a driving magnet, and is not limited thereto. The first magnetic assembly 2410 and the second magnetic assembly 2420 may be positioned on the fixed portion F2 and the movable portion 2300, respectively. In some embodiments, the positions of the fixed portion F2 and the movable portion 2300 may be interchanged. It should be noted that the interaction between the first magnetic assembly 2410 and the second magnetic assembly 2420 may create a magnetic force to move the optical module 2900 relative to the fixed portion, so auto focus (AF) or optical image stabilization (OIS) may be achieved. In some embodiments, the driving assembly D2 may include other driving elements, such as piezoelectric elements, shape memory alloys, etc.

Furthermore, the circuit board 2600 may be, for example, a flexible printed circuit, which may be affixed on the movable portion 2300 by adhesion. In some embodiments, the circuit board 2600 is electrically connected to other electronic elements disposed inside or outside the optical element driving mechanism 2100. For example, the circuit board 2600 may send electric signal to the driving assembly D2 to control the movement of the movable portion 2300.

In some embodiments, position sensor assembly 2430 may be used for detecting the position of the movable portion 2300 relative to the fixed portion F2. The position sensor assembly 2430 may include Hall sensor, magnetoresistance effect sensor (MR Sensor), giant magnetoresistance effect sensor (GMR sensor), tunneling magnetoresistance effect sensor (TMR sensor), or fluxgate sensor.

Furthermore, the position sensor assembly 2430 may include three position sensors 2432, 2434, and 2436, disposed on the same side of the optical element driving mechanism with the first magnetic elements 2412, 2414, and 2416, respectively. In some embodiments, two of the position sensors may detect magnetic fields having parallel directions, and the other position sensor may detect magnetic field having different direction to the two magnetic fields. For example, the position sensors 2432 and 2436 may detect magnetic fields in parallel directions (such as the YZ plane), and the position sensor 2434 may detect a magnetic field in the XZ plane, which is not parallel to the magnetic fields detected by the position sensors 2432 and 2436 (the magnetic field in the YZ plane). However, the present disclosure is not limited thereto. For example, in some embodiments, the position sensors 2432, 2434, and 2436 may detect magnetic fields which are not parallel. As a result, a magnetic field change in different directions may be detected.

Furthermore, a photo sensor 2970 and an optical element 2990 may at least partially overlap the driving assembly D2 (which includes the first magnetic assembly 2410 and the second magnetic assembly 2420). As a result, the space required by the optical element driving mechanism 2100 may be reduced to achieve miniaturization.

Figure 3:
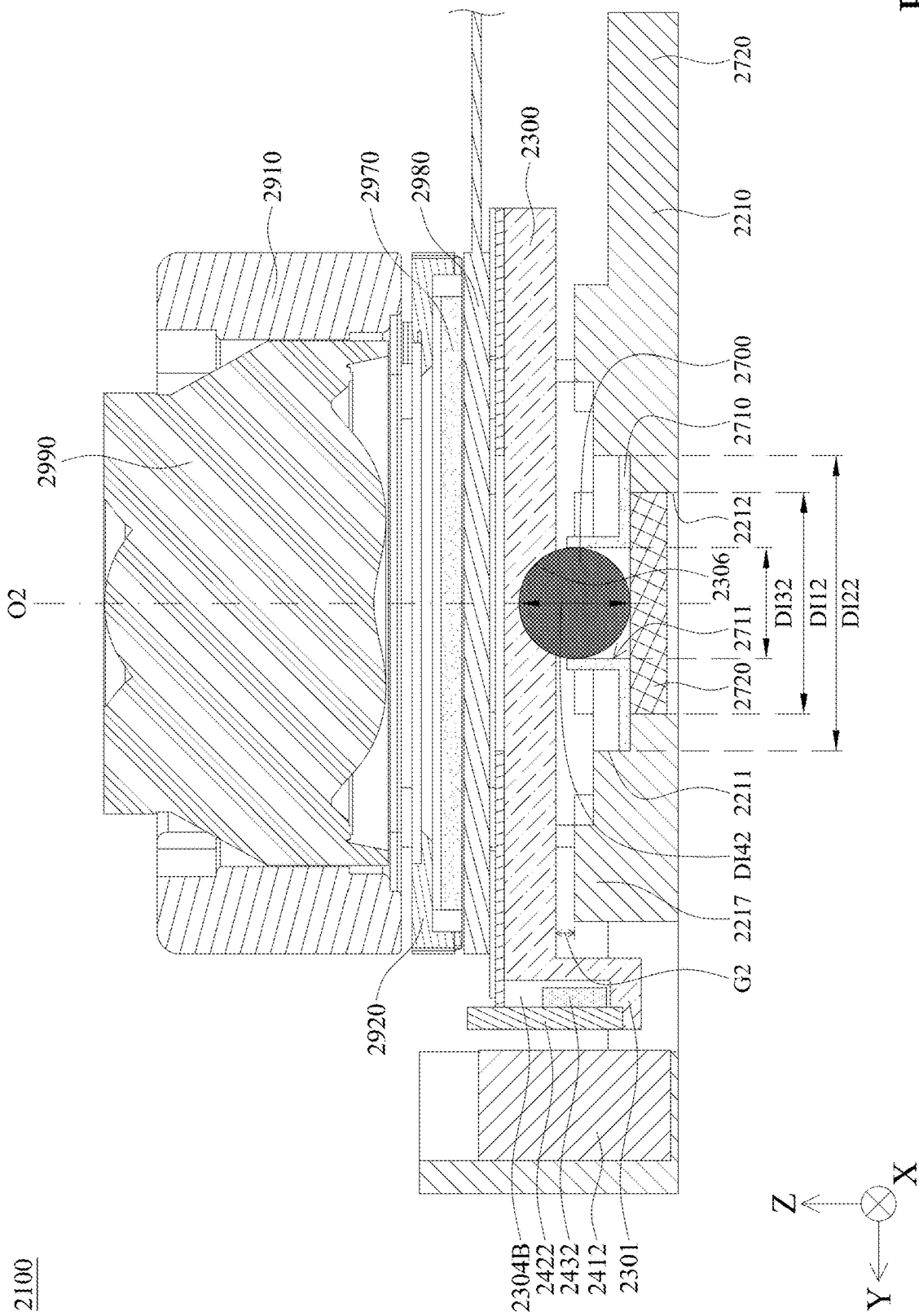
FIG. 3 is a cross-sectional view of the optical element driving mechanism.
Figure 4:
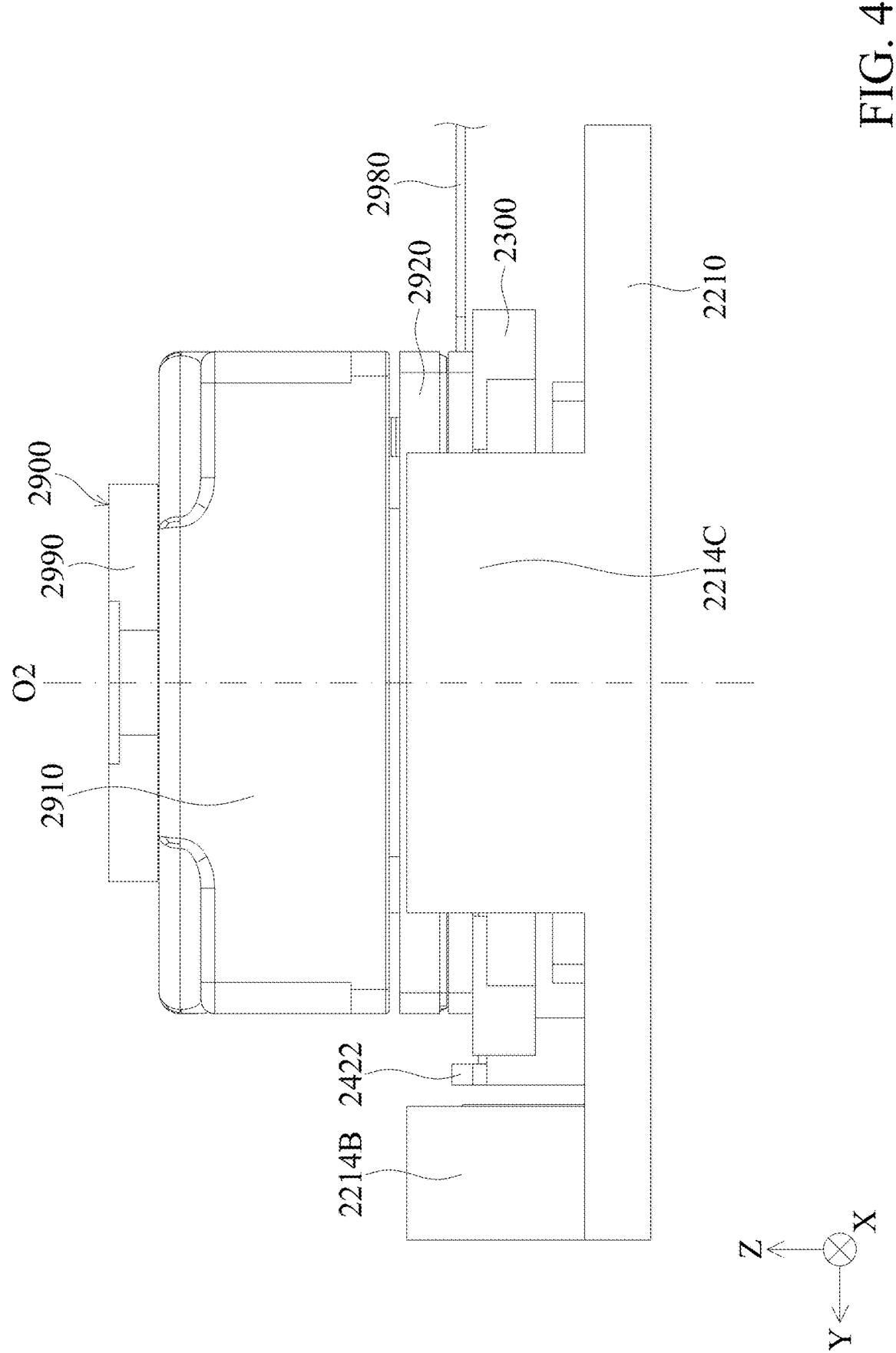
FIG. 4 is a side view of the optical element driving mechanisms.

In some embodiments, the support element 2700, the limit element 2710, and the magnetic permeable element 2720 may be called as an assist assembly AS2 to limit the movement of the movable portion 2300 relative to the fixed portion F2. As shown in FIG. 3, the support element 2700 may have a spherical shape and may be disposed in an opening 2711 of the limit element 2710, the limit element 2710 may be disposed at a recess 2211 of the base 2210, and the magnetic permeable element 2720 may be disposed at an opening 2212 of the base 2210. The diameter DI12 of the opening 221 is less than the diameter DI22 of the limit element 2710 to prevent the limit element 2710 falling out from the opening 2212.

The support element 2700 and the magnetic permeable element 2720 may include metal, and a magnetic force may be generated between the support element 2700 and the magnetic permeable element 2720 to fix the position of the support element 2700. The diameter DI32 of the opening 2711 of the limit element 2710 may be greater or substantially equal to the diameter DI42 of the support element 2700 to allow the support element 2700 to be disposed in the opening 2711 of the limit element 2710, and the moving range of the support element 2700 may be restricted. In some embodiments, the support element 2700 has an adjustable range rather than fully fixed in the opening 2711. Furthermore, in the Z direction, the diameter DI42 of the support element 2700 (maximum dimension) is greater than the distance G2 between the limit portion 2217 and the movable portion 2230. In other words, when the movable portion 2300 moving relative to the fixed portion, the support element 2700 does not fall out between the movable portion 2300 and the fixed portion F2.

Figure 5:
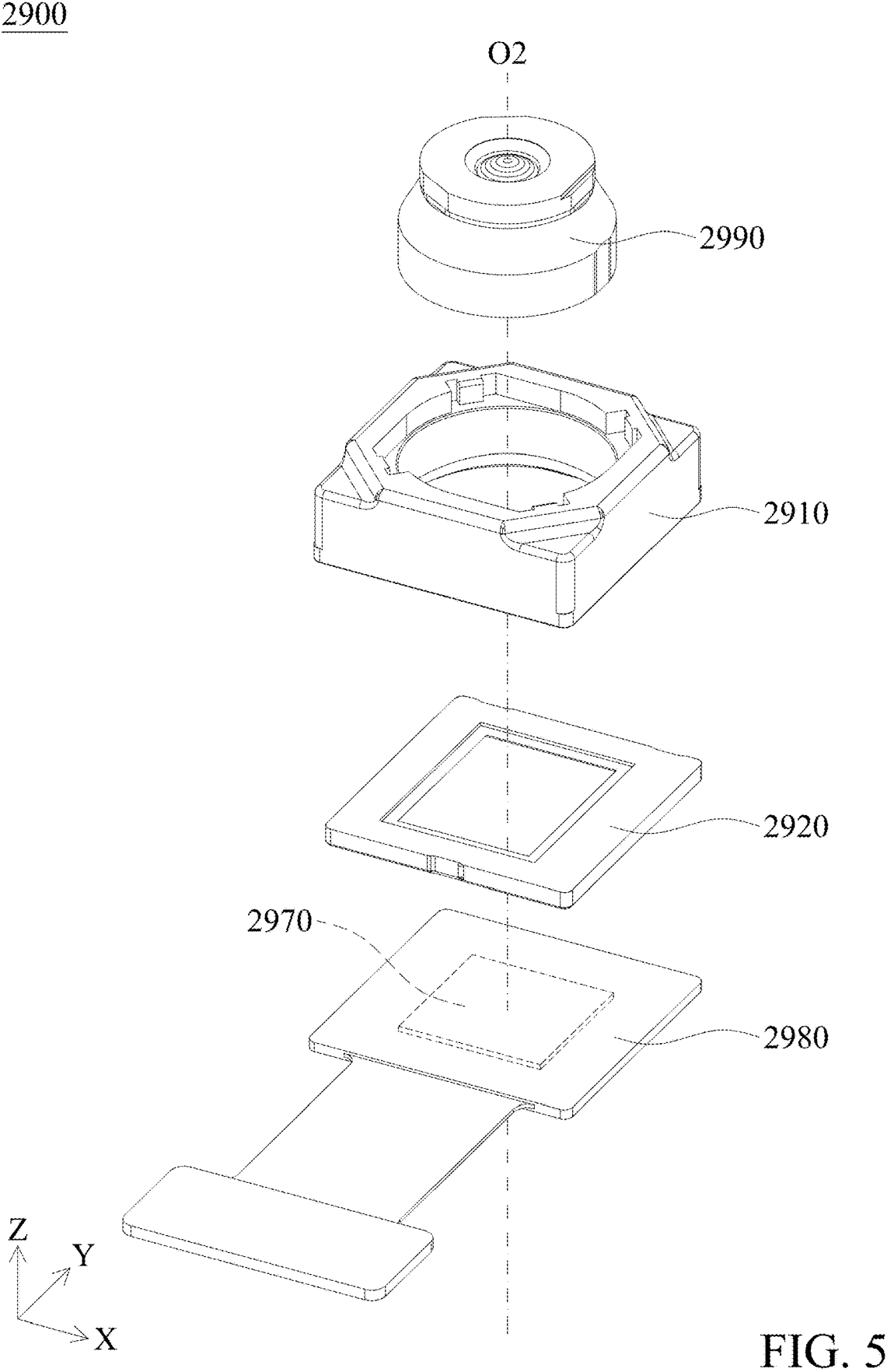
FIG. 5 is an exploded view of the optical module.

FIG. 5 is an exploded view of the optical module 2900. The optical module 2900 may include a case 2910, a base 2920, a substrate 2980, a photo sensor 2970 disposed on the substrate 2980, and an optical element 2990 disposed between the case 2910 and the base 2920. It should be noted that a case opening and a bottom opening are formed on the case 2910 and the base 2920, respectively. The center of the case opening corresponds to the main axis O2 of the optical element 2990, and the base opening corresponds to a photo sensor 2970, and the photo sensor 2970 may be disposed on a substrate 2980. As a result, the optical element 2990 disposed in the optical module 2900 may focus with the photo sensor 2970 along the main axis O2 (i.e. Z direction).

Furthermore, a moving assembly (not shown) which is movable relative to the case 2910 and the base 2920 may be disposed in the optical module 2900, and the optical element 2990 may be fixed on the movable assembly, such as by locking, gluing, or engaging. Furthermore, additional driving component may be provided in the optical module 2900, such as an assembly of a magnet and a coil (not shown), to move the optical element 2990 with the movable assembly in a direction that is different than the moving direction of the movable portion 2300. As a result, the optical element 2990 may be moved in more directions.

The substrate 2980 may be, for example, a flexible printed circuit, which may be affixed on the base 2920 by adhesion. In some embodiments, the substrate 2980 is electrically connected to other electronic elements disposed inside or outside the optical module 2900. For example, the substrate 2980 may send electric signal to the driving component to control the movement of the movable assembly in X, Y or Z direction, and thus achieving. In some embodiments, as shown in FIG. 1, an extension 2982 of the substrate 2980 and an extension 2601 of the circuit board 2600 may position at different sides of the optical element driving mechanism 2100 to be electrically connected to different elements, such as control units. Furthermore, as shown in FIG. 3, the circuit board 2600 and the substrate 2980 may partially overlap each other in the Z axis to reduce the amount of space required.

Figure 6:
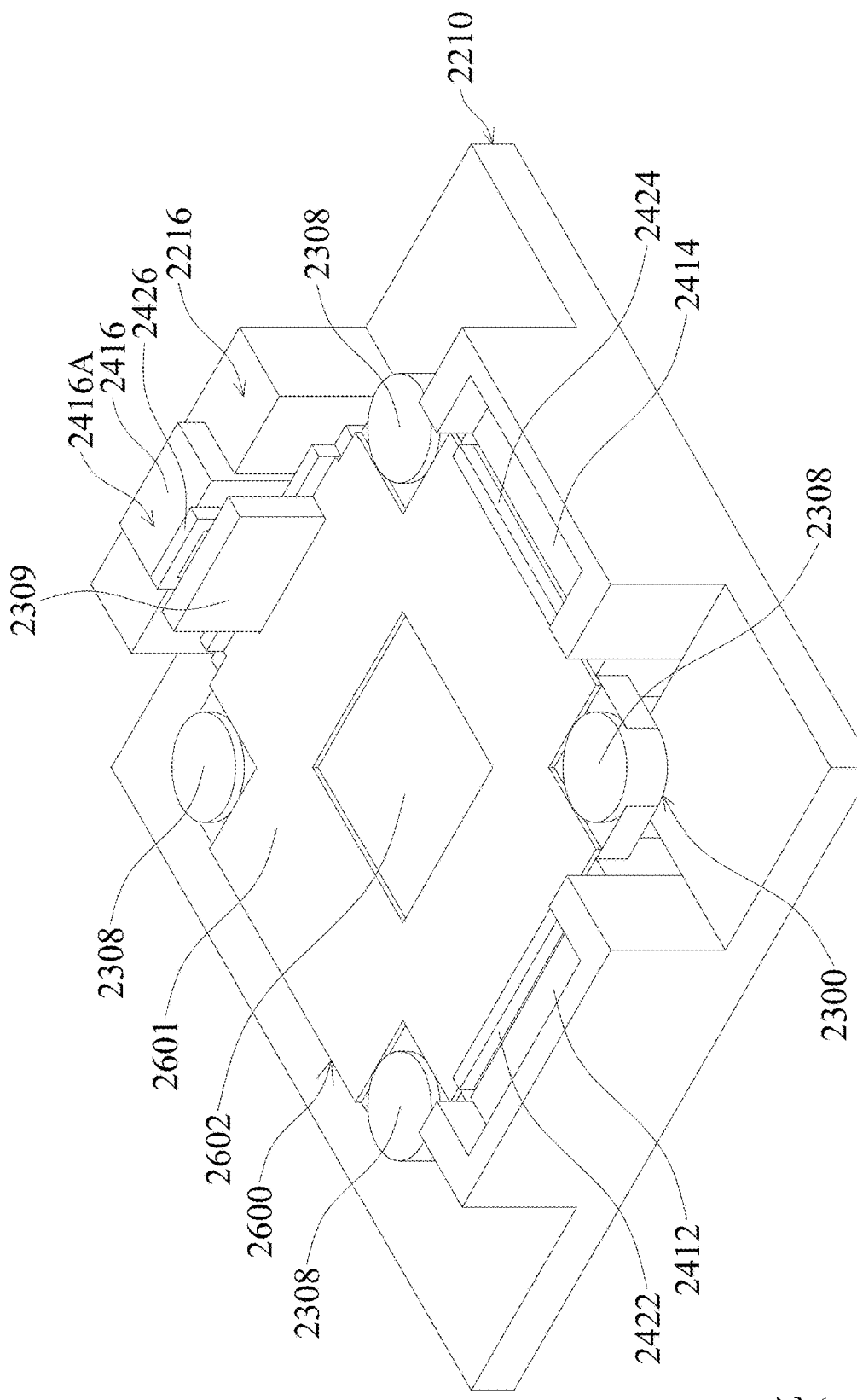
FIG. 6 is a schematic view of some elements of the optical element driving mechanism.

FIG. 6 is a schematic view of some elements of the optical element driving mechanism 2100. The circuit board 2600 may be disposed on the movable portion 2300. An opening 2602 may formed on the circuit board 2600, and other elements may be disposed in the opening 2602 to achieve miniaturization. In some embodiments, a top surface 2216 of the base 2210 may be lower than a top surface 2416A of the first magnetic element 2416 in the Z direction, so the first magnetic element 2416 which is greater in the Z direction than in other directions may be disposed on the movable portion 2300 to increase the driving force of the driving assembly D2 in the Z direction. However, the present disclosure is not limited thereto. The top surface 2416A of the first magnetic element 2416 may be lower than the top surface 2216 of the base 2210 to achieve miniaturization.

Figure 7:
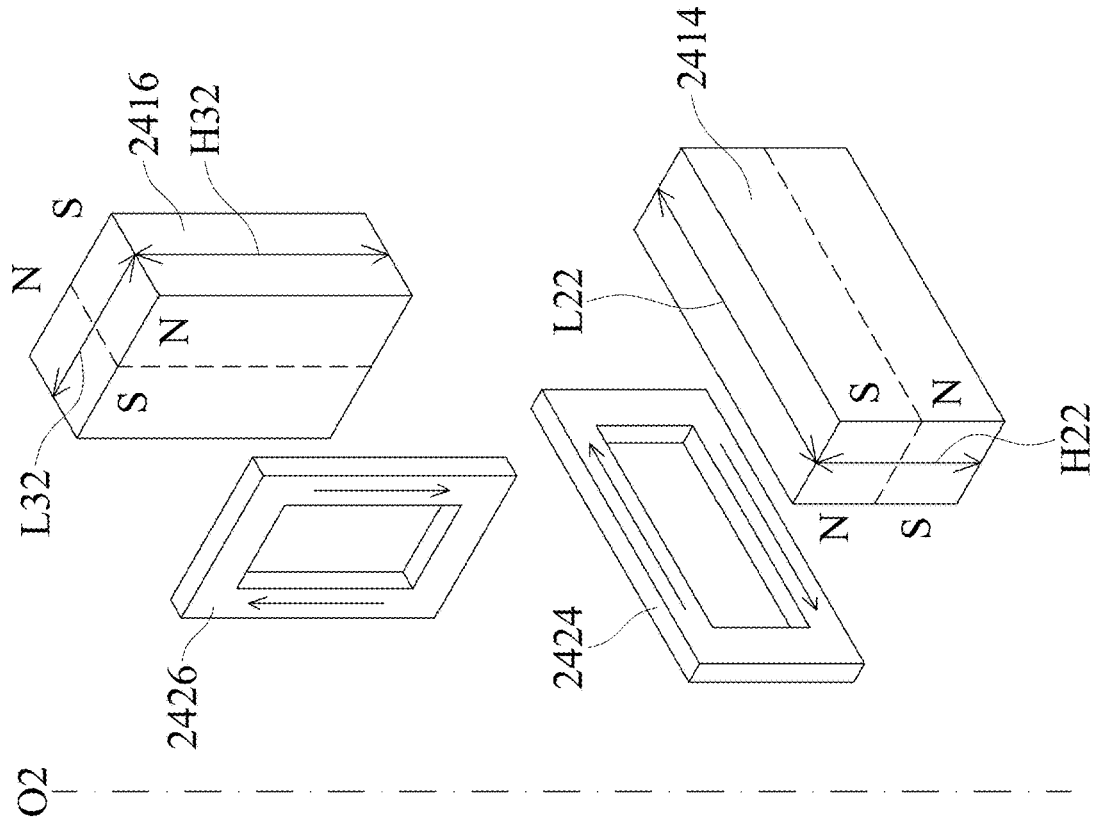
FIG. 7 is a schematic view of the driving assembly.
Figure 7:
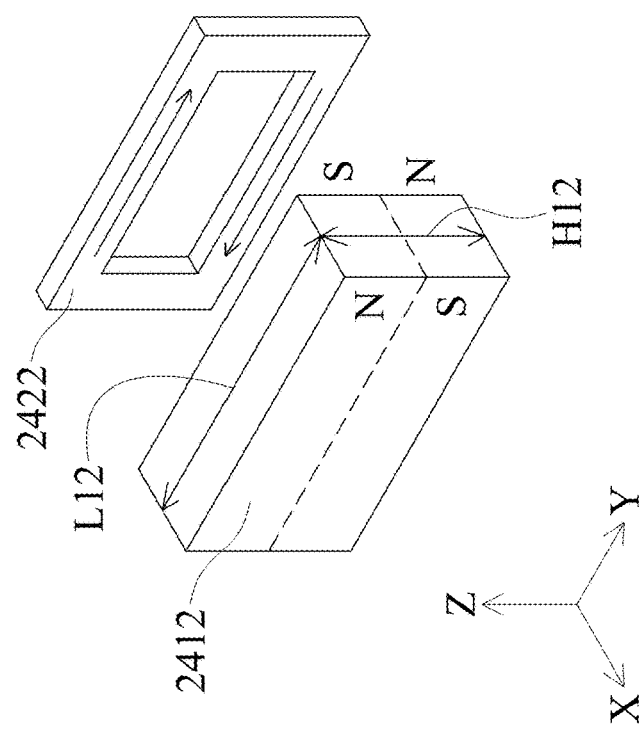

FIG. 7 is a schematic view of some elements of the optical element driving mechanism 2100. It should be noted that at least one of the first magnetic elements 2412, 2414, and 2416 may have a different shape to other first magnetic elements. For example, the height H12 of the first magnetic element 2412 or the height H22 of the first magnetic element 2414 (the dimension in the Z direction) may be lower than the height H32 of the first magnetic element 2416, and the length L12 of the first magnetic element 2412 or the length L22 of the first magnetic element 2414 (the dimension in the X or Y direction) may be greater than the length L32 of the first magnetic element 2416 to allow the first magnetic elements 2412, 2414, and 2416 to provide driving forces in different directions. Alternatively, in some embodiments, the sizes of the first magnetic elements 2412, 2414, and 2416 may be identical, but disposed in different ways. For example, the first magnetic elements 2412 and 2414 may be disposed in a horizontal way, and the first magnetic element 2416 may be disposed in a vertical way, so the driving forces in different directions may be changed.

Furthermore, FIG. 7 also shows the magnetic pole directions of the first magnetic elements 2412, 2414, and 2416 if the first magnetic elements 2412, 2414, and 2416 are magnets. For example, the first magnetic elements 2412, 2414, and 2416 may be multipolar magnets having different magnetic pole directions. As shown in FIG. 7, the magnetic pole directions of the first magnetic elements 2412 and 2414 on their upper sides and lower sides are different in the Z direction, and the magnetic pole directions of the first magnetic element 2416 on its upper side and lower side are different in the Y direction. In other words, the first magnetic elements 2412, 2414, and 2416 may have different magnetic pole directions from each other.

The second magnetic elements 2422, 2424, and 2426 may have shapes that correspond to the first magnetic elements 2412, 2414, and 2416 to provide current with different directions. As shown in FIG. 7, the main current direction of the second magnetic element 2422 is in the Y direction, the main current direction of the second magnetic element 2424 is in the X direction, and the main current direction of the second magnetic element 2426 is in the Z direction. As a result, the electromagnetic induction between the first magnetic element 2412 and the second magnetic element 2422 may rotate the movable portion 2300 relative to the Y axis, the electromagnetic induction between the first magnetic element 2414 and the second magnetic element 2424 may rotate the movable portion 2300 relative to the X axis, and the electromagnetic induction between the first magnetic element 2416 and the second magnetic element 2426 may rotate the movable portion 2300 relative to the Z axis, so the movable portion 2300 may be rotated in different directions.

Figure 8:
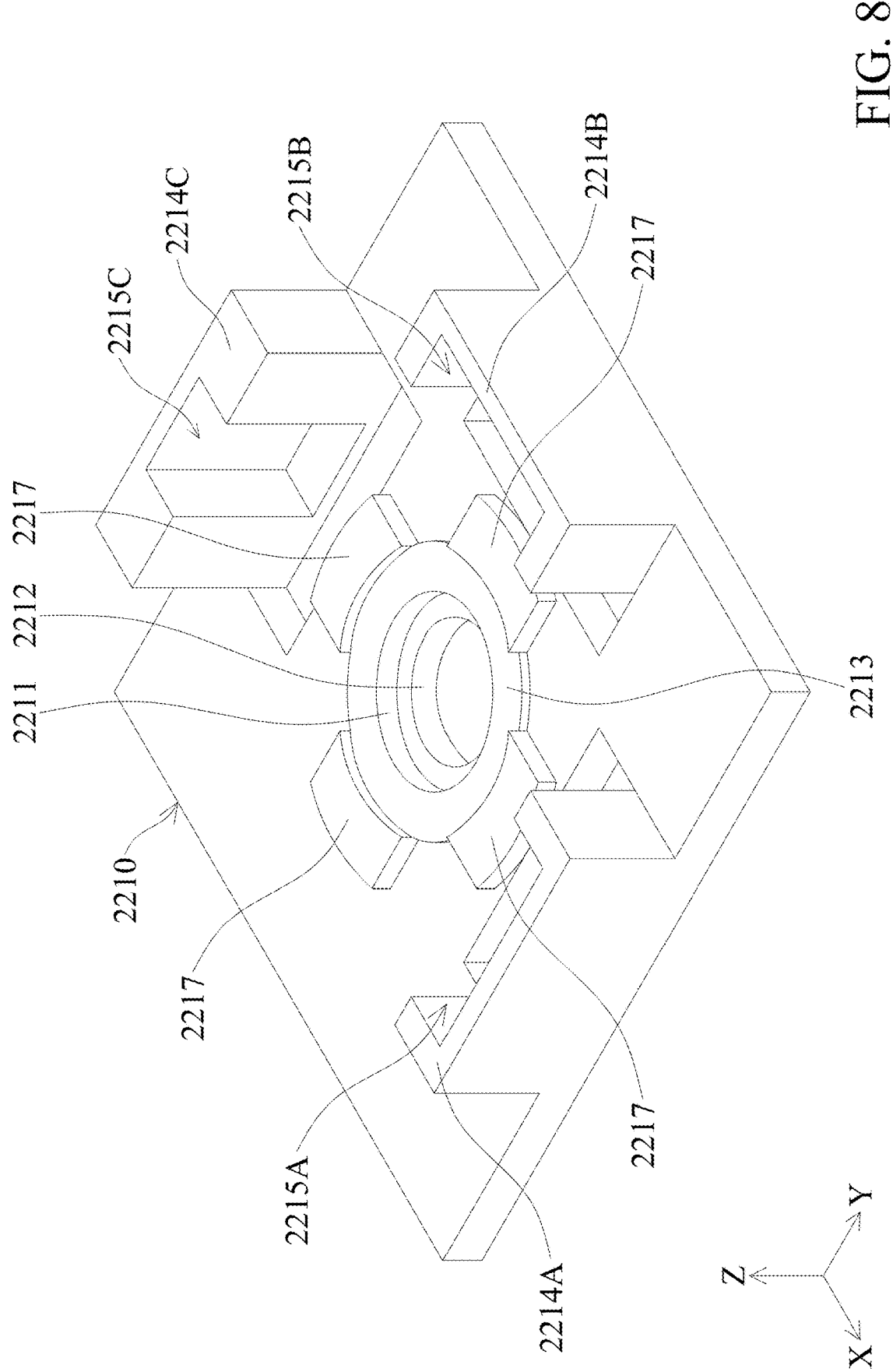
FIG. 8 is a schematic view of the base.

FIG. 8 is a schematic view of the base 2210. The base 2210 may include a recess 2211 and an opening 2212 in the recess 2211. The limit element 2710 may be disposed in the recess 2211, and the magnetic permeable element 2720 may be disposed in the opening 2212. Furthermore, in some embodiments, a ring portion 2213 that is surrounding the recess 2211 may be provided to further secure the limit element 2710.

Protrusions 2214A, 2214B and 2214C may be formed on different sides of the opening 2212 of the base 2210, and may have recesses 2215A, 2215B, and 2215C for accommodating the first magnetic elements 2412, 2414, and 2416, respectively. The first magnetic elements 2412, 2414, and 2416 have different sizes, so the protrusions 2214A, 2214B and 2214C, and the recesses 2215A, 2215B, and 2215C may have different sizes to meet different requirements.

In some embodiments, the first magnetic elements 2412, 2414, and 2416 have different lengths along the Z axis, but the height of the protrusions 2214A, 2214B, and 2214C may be substantially identical along the Z axis to balance the weight of the base 2210. In some embodiments, the base 2210 may have a limit portion 2217 that is surrounding the opening 2212 and extending in the Z direction, and is used for limiting the moving range of the movable portion 2300 relative to the fixed portion F2.

Figure 9:
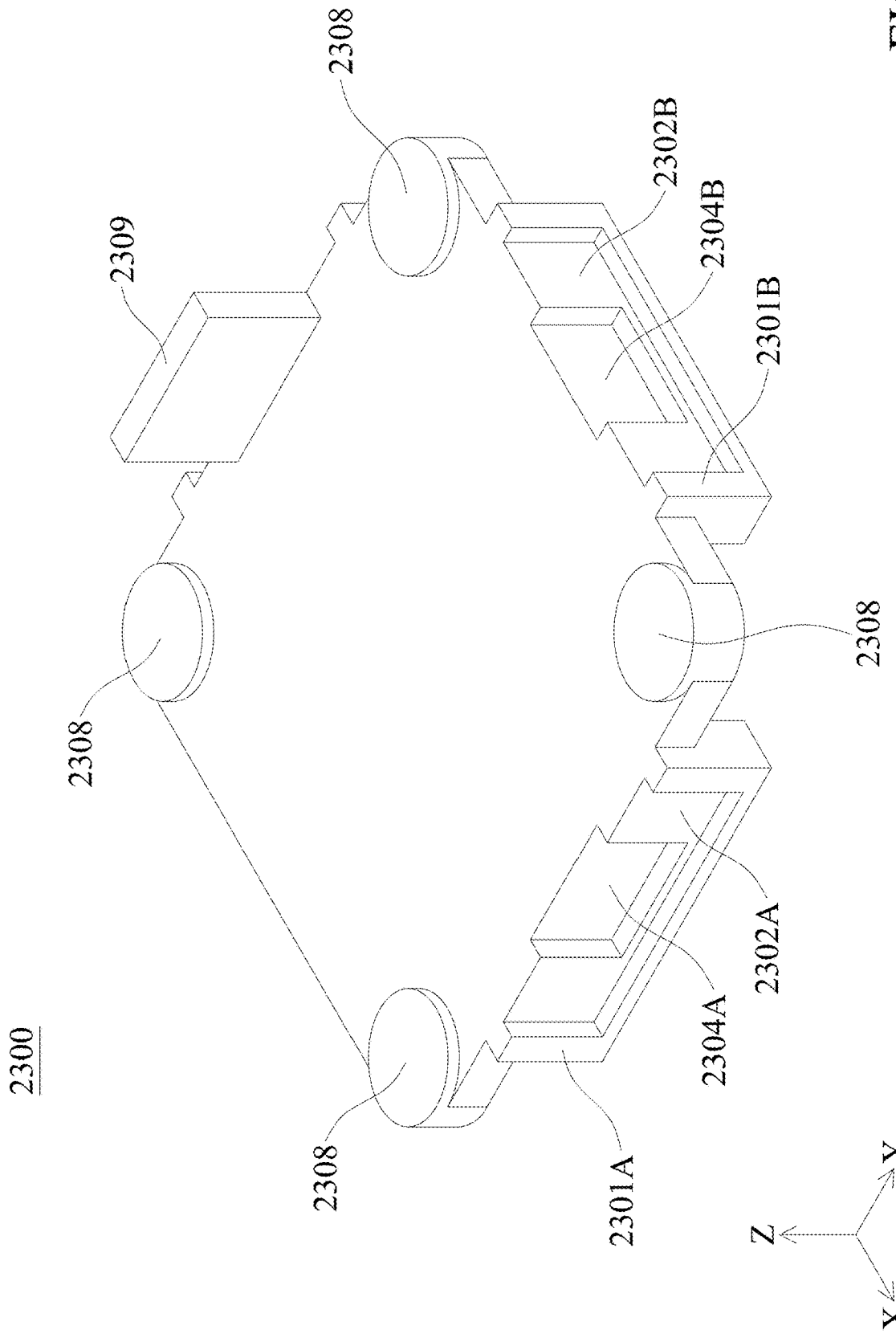
FIG. 9 and FIG. 10 are schematic views of the movable portion.
Figure 10:
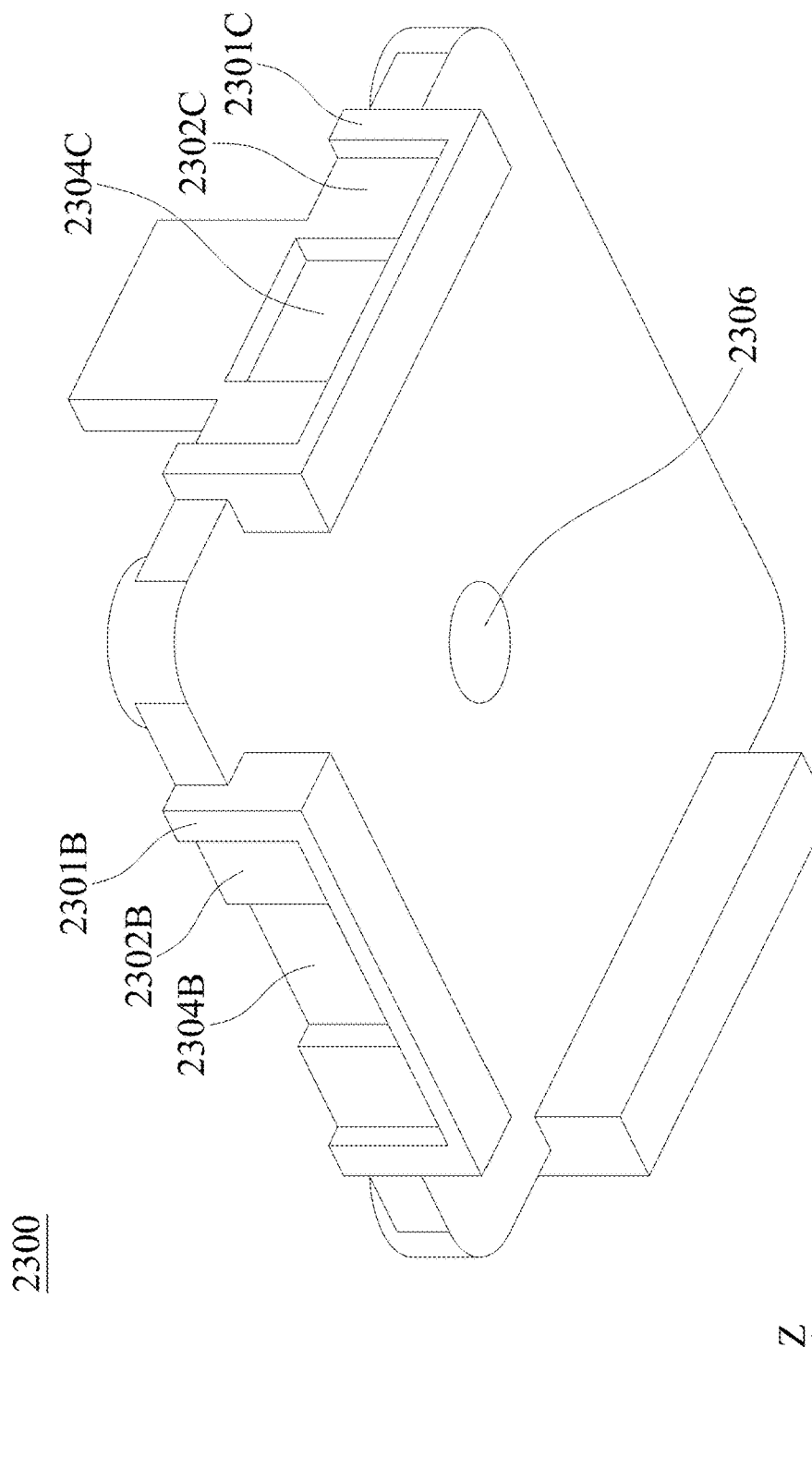

FIG. 9 and FIG. 10 are schematic views of the movable portion 2300 viewed in different directions. The movable portion 2300 may have protrusions 2301A, 2301B, and 2301C on different sides of the movable portion 2300, and recesses 2302A, 2302B, 2302C (may be called as a recess 2302) and recesses 2304A, 2304B, 2304C (may be called as a recess 2304) may be formed in the protrusions 2301A, 2301B, and 2301C, wherein the recesses 2304A, 2304B, 2304C may be formed in the recesses 2302A, 2302B, and 2302C, respectively. The recesses 2302A, 2302B, and 2302C may be used for accommodating the second magnetic elements 2422, 2424, and 2426, and the recesses 2304A, 2304B, 2304C may be used for accommodating the position sensors 2432, 2434 and 2436, respectively.

A concave portion 2306 may be positioned at the back side of the movable portion 2300, and the concave portion 2306 may have a shape corresponding to the support element 2700 for accommodating the support element 2700, such as a half-spherical shape. Columns 2308 may be positioned at the corners of the movable portion 2300 to fix the position of the circuit board. Furthermore, in some embodiments, the first magnetic element 2416 and the second magnetic element 2426 have greater sizes in the Z direction, so an additional wall 2309 may be provided on the movable portion 2300. The wall 2309 corresponds to the position of the first magnetic element 2416 and the second magnetic element 2426. For example, it may be adjacent to the first magnetic element 2416 and the second magnetic element 2426, to prevent the first magnetic element 2416 and the second magnetic element 2426 from being damaged when the movable portion 2300 is moving relative to the fixed portion F2.

Figure 11:
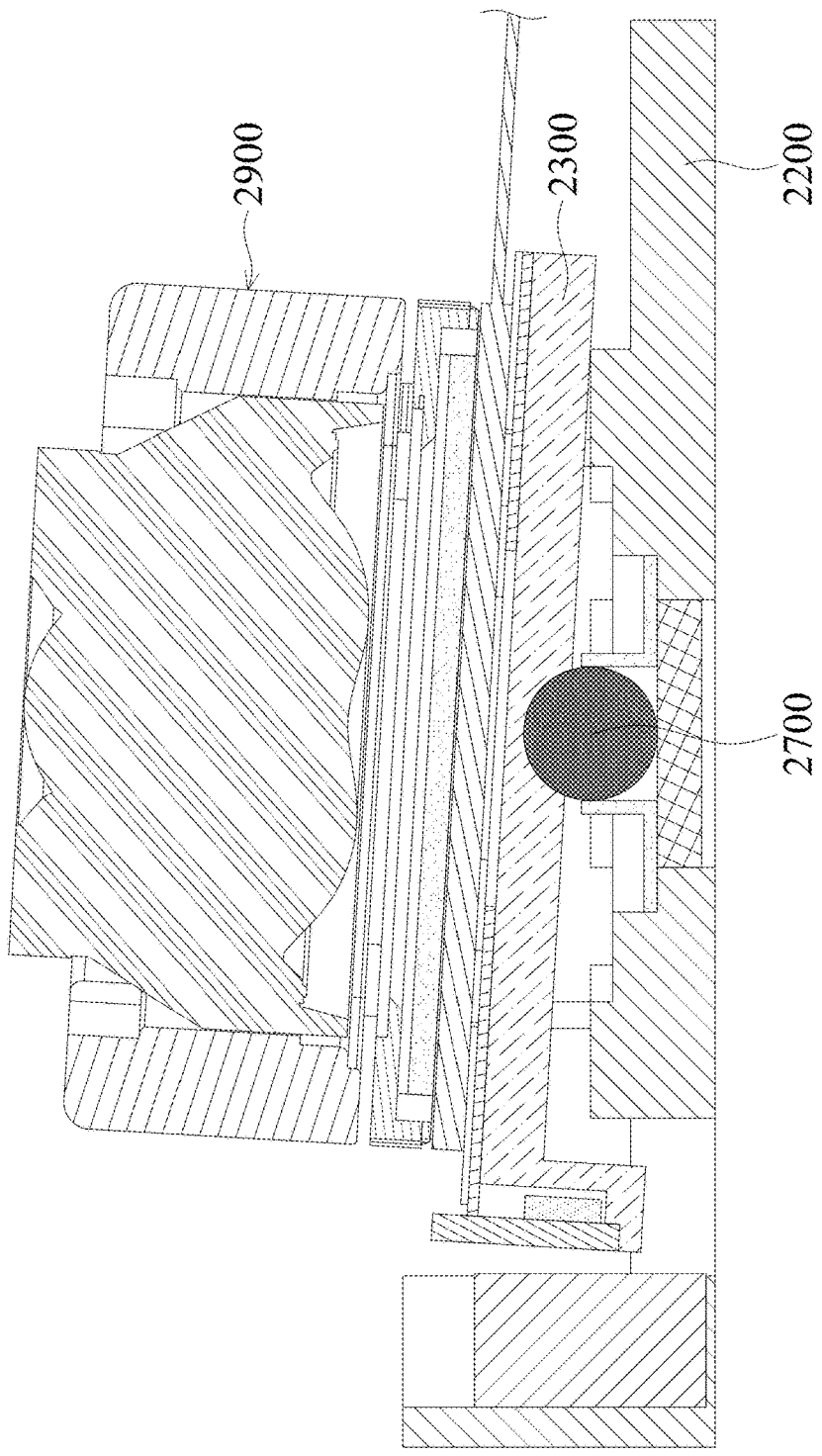
FIG. 11 is a cross-sectional view of the optical element driving mechanism when the optical element driving mechanism is moving in a direction.
Figure 12:
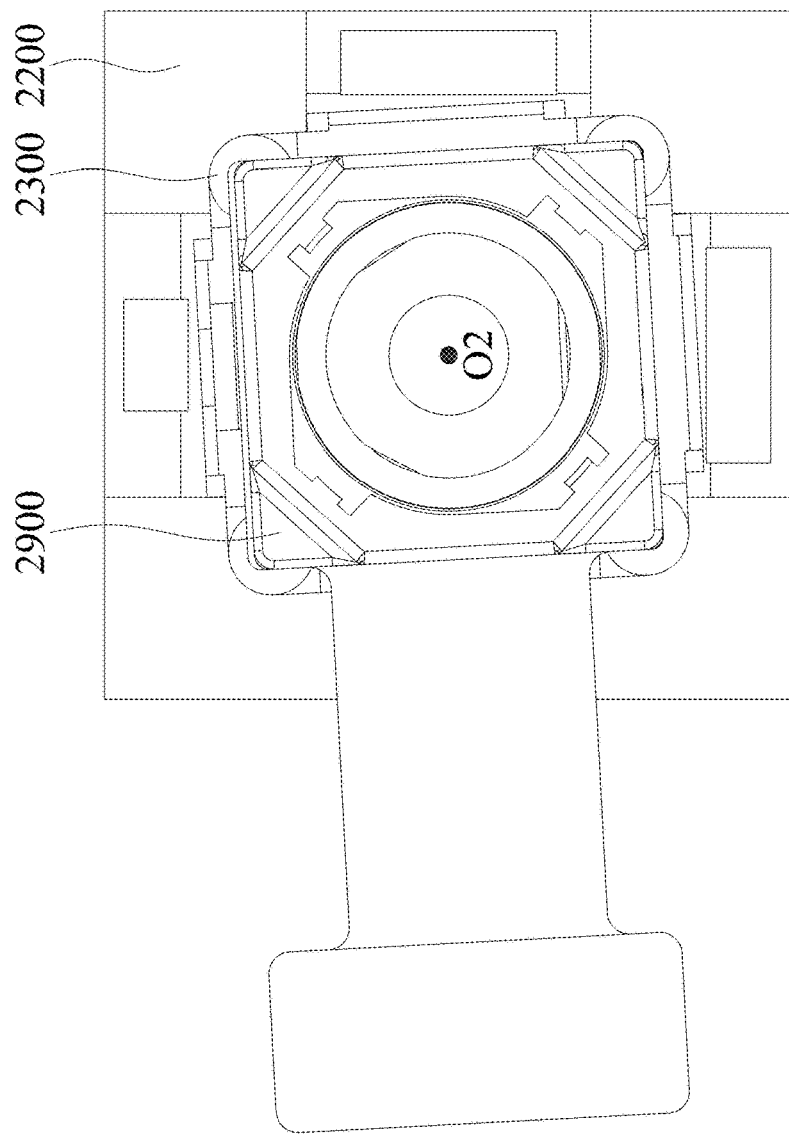
FIG. 12 is a cross-sectional view of the optical element driving mechanism when the optical element driving mechanism is moving in another direction.

FIG. 11 is a schematic view when the movable portion 2300 of the optical element driving mechanism 2100 and other elements disposed on the movable portion 2300 rotate relative to the fixed portion F2 in X axis, and FIG. 12 is a schematic view when the movable portion 2300 of the optical element driving mechanism 2100 and other elements disposed on the movable portion 2300 rotate relative to the fixed portion F2 along the Z axis. As shown in FIG. 11 and FIG. 12, the movable portion 2300 and the optical module 2900 disposed on the movable portion 2300 may rotate by the driving force generated by the driving assembly D2 in different directions using the spherical support element 2700 as a fulcrum. Although the embodiments in FIG. 11 and FIG. 12 only show the conditions that the movable portion 2300 rotate relative to a single axis, but it should be realized that the movable portion may be rotate relative to more than one axis to achieve optical image stabilization. For example, it may rotate in the X, Y and Z axes.

In summary, an optical element driving mechanism is provided. The optical element driving mechanism includes a movable portion, a fixed portion, a driving assembly, and an assist assembly. The movable portion is used for connecting to an optical element having a main axis. The movable portion is movable relative to the fixed portion. The driving assembly drives the movable portion to move relative to the fixed portion. The assist assembly limits the movement of the movable portion relative to the fixed portion. The design of the present disclosure provides the optical element with additional directions of motion, so the performance of the optical module is improved, and miniaturization can be achieved.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:

1. An optical element driving mechanism, comprising:
   a movable portion, used for connecting to an optical element having a main axis;
   a fixed portion, wherein the movable portion is movable relative to the fixed portion and arranged with the fixed portion along the main axis, and the fixed portion comprises a base;
   a driving assembly for driving the movable portion to move relative to the fixed portion; and
   an assist assembly for limiting a movement of the movable portion relative to the fixed portion, wherein the assist assembly comprises a limit element, a support element is disposed in an opening of the limit element, the main axis passes through the opening, and the limit element is disposed on a top surface of the base, wherein the limit element comprises a bottom perpendicular to the main axis and a limit portion vertically extending from the bottom along the main axis, the limit portion is in contact with the support element, the bottom is spaced apart from the support element, wherein the bottom and limit portion extend in different directions, and the bottom has a larger diameter than the limit portion in a plane perpendicular to the main axis.

2. The optical element driving mechanism as claimed in claim 1, wherein the support element is disposed between the movable portion and the fixed portion to allow the movable portion to rotate relative to the fixed portion in two axes extending in a first direction and a second direction, and the first direction is not parallel to the second direction.

3. The optical element driving mechanism as claimed in claim 2, wherein the support element further allows the movable portion to rotate relative to the fixed portion in an axis extending in a third direction, and the third direction is not parallel to the first direction or the second direction.

4. The optical element driving mechanism as claimed in claim 3, wherein the assist assembly further comprises a magnetic permeable element, wherein a material of the support element comprises metal, and a magnetic force is generated between the magnetic permeable element and the support element to attract the magnetic permeable element and the support element.

5. The optical element driving mechanism as claimed in claim 2, wherein a diameter of the opening of the limit element is greater than a diameter of the support element, and a diameter of the limit element is greater than a diameter of an opening of the base.

6. The optical element driving mechanism as claimed in claim 1, further comprising a photo sensor that at least partially overlaps the driving assembly when viewed in a direction that is perpendicular to the main axis.

7. The optical element driving mechanism as claimed in claim 1, further comprising an optical module, and the optical element is disposed in the optical module.

8. The optical element driving mechanism as claimed in claim 7, wherein the optical module partially overlaps the driving assembly when viewed in a direction that is perpendicular to the main axis.

9. The optical element driving mechanism as claimed in claim 7, further comprising a circuit board, wherein the optical module further comprises a substrate, and an extension of the substrate and an extension of the circuit board are positioned on different sides of the optical element driving mechanism.

10. The optical element driving mechanism as claimed in claim 9, wherein the substrate at least partially overlaps the circuit board along the main axis.

11. The optical element driving mechanism as claimed in claim 1, wherein the driving assembly comprises at least three driving magnets.

12. The optical element driving mechanism as claimed in claim 11, wherein at least one of the driving magnets has a different shape than the other driving magnets.

13. The optical element driving mechanism as claimed in claim 11, further comprising at least three position sensors, wherein each of the position sensors is positioned at a same side of the optical element driving mechanism with one of the driving magnets, for detecting magnetic fields of the driving magnets.

14. The optical element driving mechanism as claimed in claim 13, wherein directions of the magnetic fields that are detected by two of the position sensors are parallel.

15. The optical element driving mechanism as claimed in claim 14, wherein a direction of a magnetic field that is detected by one of the position sensors is not parallel to the directions of the magnetic fields that are detected by the two of the position sensors.

16. The optical element driving mechanism as claimed in claim 11, wherein the driving magnets are multipolar magnets.

17. The optical element driving mechanism as claimed in claim 16, wherein the magnets are arranged in different directions.

18. The optical element driving mechanism as claimed in claim 1, wherein the movable portion comprises a wall that extends along the main axis and is adjacent to the driving assembly.

* * * * *